US008987158B2

(12) United States Patent
Knickerbocker

(10) Patent No.: US 8,987,158 B2
(45) Date of Patent: Mar. 24, 2015

(54) FRIABLE-RESISTANT DIELECTRIC PORCELAIN

(71) Applicant: Victor Insulators, Inc., Victor, NY (US)

(72) Inventor: Ira Knickerbocker, Victor, NY (US)

(73) Assignee: Victor Insulators, Inc., Victor, NY (US)

( * ) Notice: Subject to any disclaimer, the term of this patent is extended or adjusted under 35 U.S.C. 154(b) by 82 days.

(21) Appl. No.: 13/679,665

(22) Filed: Nov. 16, 2012

(65) Prior Publication Data

US 2014/0137814 A1 May 22, 2014

(51) Int. Cl.
*C04B 33/26* (2006.01)
*C04B 35/14* (2006.01)
*F02M 25/12* (2006.01)
*C04B 33/34* (2006.01)
*C04B 35/626* (2006.01)
*B28B 11/24* (2006.01)

(52) U.S. Cl.
CPC ............... *C04B 35/14* (2013.01); *F02M 25/12* (2013.01); *C04B 33/26* (2013.01); *C04B 33/34* (2013.01); *C04B 35/6263* (2013.01); *B28B 11/243* (2013.01); *C04B 2235/3201* (2013.01); *C04B 2235/3206* (2013.01); *C04B 2235/3208* (2013.01); *C04B 2235/3217* (2013.01); *C04B 2235/3232* (2013.01); *C04B 2235/3272* (2013.01); *C04B 2235/3418* (2013.01); *C04B 2235/3472* (2013.01); *C04B 2235/349* (2013.01); *C04B 2235/5436* (2013.01); *C04B 2235/606* (2013.01); *C04B 2235/72* (2013.01); *C04B 2235/727* (2013.01); *C04B 2235/94* (2013.01)
USPC .......................................... 501/143; 501/144

(58) Field of Classification Search
CPC ............. F02B 29/0443; F02B 29/0475; F02B 29/0493; F02M 25/0707; F02M 25/0737; F02M 25/0731; F02M 1/00; F02M 2700/4321; F02M 25/022; C04B 33/025; C04B 33/26
USPC ......... 123/41.12, 41.49, 41.65, 542; 501/143, 501/144
See application file for complete search history.

(56) References Cited

U.S. PATENT DOCUMENTS

| 3,967,131 | A | 6/1976 | Slipiec et al. | |
|---|---|---|---|---|
| 4,034,229 | A | 7/1977 | Grossen et al. | |
| 4,183,760 | A * | 1/1980 | Funk et al. | 501/144 |
| 4,770,858 | A | 9/1988 | Collins | |
| 4,940,894 | A | 7/1990 | Morters | |
| 4,983,556 | A * | 1/1991 | Seike et al. | 501/143 |
| 5,272,414 | A | 12/1993 | Iwanaga | |
| 5,641,720 | A * | 6/1997 | Fassbinder | 501/141 |
| 5,871,701 | A | 2/1999 | Long | |
| 6,217,833 | B1 | 4/2001 | Kolu | |
| 6,811,757 | B2 | 11/2004 | Niv et al. | |
| 7,514,377 | B2 | 4/2009 | Sato et al. | |
| 7,798,133 | B2 | 9/2010 | Clack | |
| 2009/0107112 | A1 | 4/2009 | Hammer | |
| 2009/0211895 | A1 | 8/2009 | Sewell et al. | |
| 2010/0083939 | A1 | 4/2010 | Hammer et al. | |
| 2011/0030625 | A1 | 2/2011 | Hammer et al. | |
| 2011/0048371 | A1 | 3/2011 | McAlister | |
| 2011/0114571 | A1 | 5/2011 | Cannavino et al. | |

* cited by examiner

*Primary Examiner* — Karl Group
(74) *Attorney, Agent, or Firm* — LeClairRyan, a Professional Corporation

(57) ABSTRACT

The present invention relates to a composition for forming a friable-resistant dielectric porcelain material. The present invention also relates to a friable-resistant dielectric porcelain material formed from the composition of the present invention, a method of making a friable-resistant dielectric porcelain material, a friable-resistant dielectric porcelain material formed by the method of the present invention, a dielectric porcelain material comprising a particular composition, and a system for producing ozone using the dielectric porcelain material of to the present invention.

2 Claims, 3 Drawing Sheets

FIGs. 1A-C

FRIABLE-RESISTANT DIELECTRIC PORCELAIN

FIELD OF THE INVENTION

The present invention relates to a friable-resistant dielectric porcelain material, a composition for forming a friable-resistant dielectric porcelain material, a method of making a friable-resistant dielectric porcelain material, a friable-resistant dielectric porcelain material formed by the method of the present invention, a dielectric porcelain material, and systems for producing ozone.

BACKGROUND OF THE INVENTION

The production of ozone involves the addition of an oxygen atom to an oxygen molecule to produce $O_3$ from $O_2$. The ozone molecule is very unstable and easily disposes of one oxygen atom when it reacts with a carbon containing molecule. This makes ozone a strong oxidizer. Commercially, ozone is used as a bactericide, e.g., for treatment of water systems. In addition, ozone has been used to increase the efficiency of internal combustion engines and, at the same time, eliminate unhealthy emissions from such engines, including non-combusted fuel vapor and fuel particles, carbon monoxide, and nitrogen oxides.

Ozone can be produced using a variety of methods, although the corona discharge method predominates in the ozone generation industry. The corona discharge method involves passing an oxygen containing gas through two electrodes separated by a dielectric and a discharge gap. Voltage is applied to the electrodes causing a strong potential gradient and an electron flow across the gap. These electrons provide the energy to disassociate the oxygen molecules in the oxygen containing gas, leading to the formation of ozone. Higher voltages, higher electrical frequencies, and smaller separation distances between electrodes lead to more effective ozone generation. Increasing the effectiveness of an ozone generating device by optimizing these variables requires high performance dielectric materials that will withstand high electrical stress, elevated operating temperatures, and ozone rich environments without failure over extended duration.

A variety of different materials have been used in the dielectric component of a corona discharge unit, including aluminum oxide, glass, ceramics, and polymers. The range of materials used to form the dielectric component of ozone generation devices varies widely, because there is a broad range of operating environments, such as those for use with water purification systems, air cleaners, and internal combustion engines.

Since much of the electrical energy input to a corona discharge ozone generator—as high as 85%—is converted into heat, the dielectric component must be made of a material that possesses high thermal stability both physically and chemically under rigorous heat cycles and harsh chemical environments, ideally over great lengths of time. Despite a substantial number of different devices formed from a substantial number of different materials being taught or disclosed, few have resulted in a commercially viable material, particularly one intended for use with the combustion of hydrocarbon fuels. One major deficiency of prior dielectric materials relates to their loss of dielectric strength at elevated temperatures, under high electrical stress, and in an ozone rich environment. For example, materials like alumina are subject to cracking or flaking and electrical failure. Glass and plastics tend to become friable under the harsh conditions of a high performance ozone generating unit. This friability then results in premature failure of the device.

Breakdown of the dielectric material in an ozone generation device can cause a variety of problems, including the possibility of dielectric particulate material being carried into a combustion chamber.

The development of an adequate material and process used to create well performing dielectrics will result in energy savings and reduced pollution when applied to diesel engines and other applications where ozone discharge units are used.

The present invention is directed to overcoming these and other deficiencies in the art.

SUMMARY OF THE INVENTION

One aspect of the present invention relates to a composition for forming a friable-resistant dielectric porcelain material. The composition comprises either (A) or (B) as follows:

(A)

feldspar at about 21% to about 27% by weight, where at least 99.9% of the feldspar has a particle size less than about 72 microns and the feldspar has a potash to soda ratio of at least 10 to 1;

calcined alumina at about 32% to about 38% by weight, where at least 99.9% of the calcined alumina has a particle size less than about 44 microns; and clay at about 37% to about 43% by weight, where at least 99.9% of the clay has a particle size less than about 22 microns;

(B)

feldspar at about 28% to about 34% by weight, where at least 99.9% of the feldspar has a particle size less than about 72 microns and the feldspar has a potash to soda ratio of at least about 10 to 1;

crystalline silica at about 22% to about 28% by weight, where at least 99.9% of the crystalline silica has a particle size less than about 44 microns; and clay at about 41% to about 47% by weight, where at least 99.9% of the clay has a particle size less than about 22 microns.

Another aspect of the present invention relates to a method of making a friable-resistant dielectric porcelain material. This method involves providing an aqueous composition comprising water and the composition (A) or (B) of the present invention. The aqueous composition is processed to form a homogenous mixture, which is then formed into a shaped article. The shaped article is fired (e.g., in a kiln) at a temperature of about 2012° F. (1100° C.) to about 2462° F. (1350° C.) to form a friable-resistant dielectric porcelain material.

A further aspect of the present invention relates to a friable-resistant dielectric porcelain material formed from the composition (A) or (B) of the present invention.

Another aspect of the present invention relates to a method of making a friable-resistant dielectric porcelain material. This method involves providing a clay slurry comprising clay and water, where 99.9% by weight of the clay in the clay slurry has a particle size less than about 22 microns. A feldspar flux material and a filler material are added to the clay slurry to form an aqueous composition. The feldspar flux material has a potash to soda ratio of at least 10 to 1. The aqueous composition is processed to form a homogenous mixture, which is then formed into a shaped article. The shaped article is then fired in a kiln at a temperature of about 2012° F. (1100° C.) to about 2462° F. (1350° C.) to form a friable-resistant dielectric porcelain material.

Yet another aspect of the present invention relates to a friable-resistant dielectric porcelain material formed by the method of the present invention.

Still another aspect of the present invention relates to a dielectric porcelain material comprising (I) or (II) as follows:

(I)
about 5% to about 7% $K_2O$,
about 0.2% to about 0.6% $Na_2O$,
about 16% to about 20% $Al_2O_3$, and
about 70% to about 75% $SiO_2$, or (II)
about 5% to about 6% $K_2O$,
about 0.2% to about 0.5% $Na_2O$,
about 50% to about 55% $Al_2O_3$, and
about 40% to about 42% $SiO_2$.

In certain embodiments, the material comprises less than about 1% by volume of individual crystals or closed pores greater than 22 microns in diameter; the material has zero apparent porosity; or the material possesses all of these properties.

Yet another aspect of the present invention relates to a system for producing ozone. The system includes an electrode/dielectric assembly comprising a first and a second electrode and a dielectric device positioned between the first and second electrodes, where the dielectric device comprises the dielectric porcelain material according to the present invention. The system also includes a voltage source connected to the first and second electrodes, where the voltage source is capable of producing a voltage differential between the first and second electrodes sufficient to cause the production of ozone between the electrodes.

Still a further aspect of the present invention relates to a method for producing ozone. This method involves providing the system for producing ozone according to the present invention and changing oxygen in the air surrounding the system to ozone.

Yet another aspect of the present invention relates to a system comprising an internal combustion engine coupled to the system for producing ozone of the present invention.

The present invention relates to a high performance, highly friable resistant, dielectric for corona discharge ozone generators produced from high performance ceramics porcelain coated with a highly friable resistant oxide glaze. The porcelain material and friable resistant oxide glaze of the present invention are designed to have sufficient mechanical strength, thermal shock resistance, dielectric strength, and stability to allow for their use in harsh environments, including a corona discharge environment associated with an internal combustion engine. The porcelain material of the present invention offers enhanced chemical and physical strength to facilitate a superior ozone generator performance throughout its thermal operating range.

BRIEF DESCRIPTION OF THE DRAWINGS

FIG. 1A is a perspective view of the friable-resistant dielectric porcelain material formed into a hollow cylinder or open-ended tube. FIG. 1B is a plan view of the friable-resistant dielectric porcelain material formed into a hollow cylinder or open-ended tube. FIG. 1C is an enlarged perspective view of a portion of the hollow cylinder or open-ended tube of FIG. 1B.

DETAILED DESCRIPTION OF THE INVENTION

Figure 1:
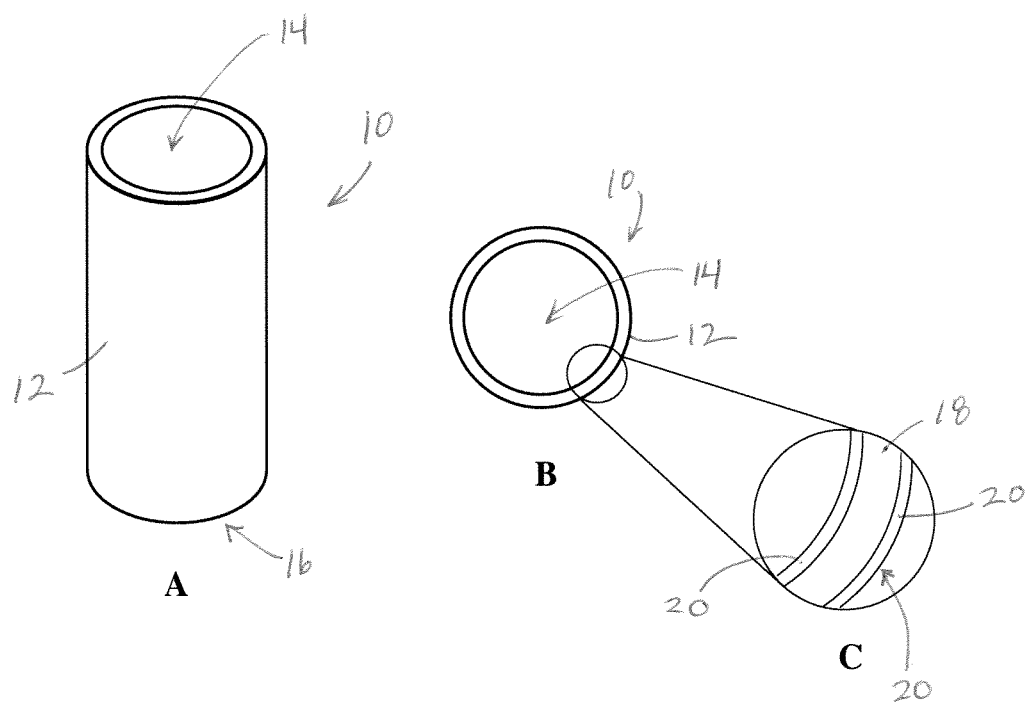
FIGS. 1A-C show one embodiment of a friable-resistant dielectric porcelain material of the present invention formed into a hollow cylinder or open-ended tube.

The present invention relates generally to a friable resistant dielectric porcelain material (i.e., a final product), compositions for forming the friable resistant dielectric porcelain material (i.e., an intermediate to a final product), and methods of making friable resistant dielectric porcelain material from the compositions. The present invention also relates to methods of using the friable resistant dielectric porcelain material in systems for producing ozone.

A first aspect of the present invention relates to a composition that can be used to form a friable resistant dielectric porcelain material. The composition comprises either (A) or (B) as follows:

(A)
feldspar at about 21% to about 27% by weight, where at least 99.9% of the feldspar has a particle size less than about 72 microns and the feldspar has a potash to soda ratio of at least 10 to 1;
calcined alumina at about 32% to about 38% by weight, where at least 99.9% of the calcined alumina has a particle size less than about 44 microns; and
clay at about 37% to about 43% by weight, where at least 99.9% of the clay has a particle size less than about 22 microns;

(B)
feldspar at about 28% to about 34% by weight, where at least 99.9% of the feldspar has a particle size less than about 72 microns and the feldspar has a potash to soda ratio of at least about 10 to 1;
crystalline silica at about 22% to about 28% by weight, where at least 99.9% of the crystalline silica has a particle size less than about 44 microns; and
clay at about 41% to about 47% by weight, where at least 99.9% of the clay has a particle size less than about 22 microns.

In composition (A), feldspar is present in an amount of about 21% to about 27% by weight, or about 22% to about 26% by weight, or about 23% to about 25% by weight, or about 24% by weight. At least 99.9% of the feldspar used in the compositions of the present invention has a particle size less than about 72 microns, 70 microns, 68 microns, 66 microns, 64 microns, 62 microns, 60 microns, or lower.

Achieving the stated particle size limitations of the feldspar and other ingredients in compositions (A) and (B) of the present invention can be accomplished by processing methods known and used by those of ordinary skill in the art. For example, materials of the compositions of the present invention may be processed (i.e., from their supplied or raw material state) by mesh screening (i.e., filtering through a mesh screen), hydrocyclone separation, and/or milling. Such processing is carried out until it may be said that 99.9% of particles more coarse than the particle sizes designated herein have been removed from the supplied or raw material ingredients.

Porcelain materials (i.e., final products) made from the compositions of the present invention have distinct advantages because of the processing of the particle sizes of the raw materials that make the compositions. Having consistent particle sizes, with virtually no particles of a size greater than those designated herein, and having the ingredients well mixed during processing, contributes to the formation of a material with a homogenous structure. As discussed in more detail below, these features of compositions (A) and (B), and particular processing steps described herein, contribute to the formation of a friable resistant porcelain material (i.e., final product) that is suitable for use as a dielectric in ozone generating systems.

The feldspar present in the compositions of the present invention has a potash to soda ratio of at least about 10:1, 11:1, 12:1, 13:1, 14:1, 15:1, or greater. Without being bound by theory, it is believed that the porcelain material (i.e., final product) of the present invention achieves advantageous properties as a result of the presence of a greater amount of potash compared to soda in the feldspar component of the composition. This feature, combined with strict control of particle size (e.g., by strict processing methods), creates a final product porcelain material with improved properties. Moreover, increased potassium (potash) in the feldspar component of the compositions of the present invention at the expense of sodium (soda) means that a larger potassium ion is replacing a smaller sodium ion. This replacement is believed to help strengthen the porcelain material and make it more suitable as a dielectric material. Under the increased voltage and increased temperature conditions of an improved ozone generator system, the larger potassium ion will not migrate as easily as the smaller sodium ion, so dielectric strength is improved. The use of potash feldspar also improves the gyroplastic properties of porcelain (i.e., the material suffers less deformation at higher firing temperatures, an important property when making very thin walled dielectric articles).

Composition (A) described herein has calcined alumina at about 32% to about 38% by weight, or about 33% to about 37% by weight, or about 34% to about 36% by weight, or about 35% by weight. At least 99.9% of the calcined alumina has a particle size less than about 44 microns, 42 microns, 40 microns, 38 microns, 36 microns, 34 microns, 32 microns, 30 microns, or lower.

The clay component of composition (A) is present in an amount of about 37% to about 43% by weight, or about 38% to about 42% by weight, or about 39% to about 41% by weight, or about 40% by weight. At least 99.9% of the clay in the compositions of the present invention has a particle size less than about 22 microns, 20 microns, 18 microns, 16 microns, 14 microns, 12 microns, 10 microns, or lower.

Clays suitable for use in ceramic and porcelain materials are well known by persons of ordinary skill in the art. Suitable clays include, without limitation, mixed ball clays and kaolin. More specifically, suitable clays include, without limitation, ball clays and kaolins mined from deposits in the southeastern regions of the United States (Florida, Georgia, Kentucky, Mississippi, and Tennessee are known to have suitable deposits). According to one embodiment of the present invention, the clay component of the compositions of the present invention is derived from an aqueous clay suspension that is processed by one or more of the following processing methods: high intensity mixing, passing through fine screens, passing through hydrocyclones, and milling to produce the clay where at least 99.9% of the clay has the designated particle size.

Composition (B) of the present invention has feldspar present in an amount of about 28% to about 34% by weight, or about 29% to about 33% by weight, or about 30% to about 32% by weight, or about 31% by weight.

Composition (B) differs from composition (A) in that it includes crystalline silica in place of the calcined alumina. Composition (B) includes at least about 22% to about 27% by weight, or about 23% to about 26% by weight, or about 24% to about 25% by weight crystalline silica. The choice between compositions (A) and (B) of the present invention will depend on the particular use for which the ceramic material produced from the composition is intended. In some applications, it may be more advantageous to have a porcelain material with an alumina filler material, while in other applications it may be advantageous to have a porcelain material with a silica filler material. Thus, the choice between composition (A) of the present invention and composition (B) of the present invention is a choice between the porcelain materials formed from the compositions, where the porcelain material has more alumina or silica.

Like composition (A), composition (B) includes clay. However, in composition (B) the clay is present in an amount of about 41% to about 47% by weight, or about 42% to about 46% by weight, or about 43% to about 45% by weight, or about 44% by weight.

Another aspect of the present invention relates to a friable-resistant dielectric porcelain material (i.e., final product) formed from composition (A) or (B) of the present invention.

The present invention also relates to methods of making a friable-resistant dielectric porcelain material. According to one embodiment, a friable-resistant dielectric porcelain material of the present invention is made from composition (A) or (B) of the present invention. This method involves providing composition (A) or (B) as an aqueous composition, processing the aqueous composition to form a homogenous mixture, forming the composition into a shaped article, and firing the shaped article in a kiln at a temperature of about 2012° F. (1100° C.) to about 2462° F. (1350° C.) to form a friable-resistant dielectric porcelain material.

According to another embodiment, a friable-resistant dielectric porcelain material of the present invention is made by providing a clay slurry comprising clay and water, where 99.9% by weight of the clay in the clay slurry has a particle size less than about 22 microns. A feldspar flux material and a filler material are added to the clay slurry to form an aqueous composition. The feldspar flux material has a potash to soda ratio of at least 10:1, or a variation thereof as described above. The aqueous composition is processed to form a homogenous mixture. The homogenous mixture is formed into a shaped article. The shaped article is then fired in a kiln at a temperature of about 2012° F. (1100° C.) to about 2462° F. (1350° C.) to form a friable-resistant dielectric porcelain material.

Feldspar and filler materials added to the clay slurry are as described herein. In addition to the calcined alumina and crystalline silica filler materials described above, other filler materials, such as bauxite and others known by those of ordinary skill in the art or filler materials yet to be developed, can also be used.

In one embodiment, the clay slurry is processed. Processing the clay slurry may involve passing the slurry through a sieve and/or a hydrocyclone separator to intimately mix the slurry and to remove coarse particles and/or contaminants or impurities.

In one embodiment, the clay slurry is passed through a 150 mesh screen or up to a 500 mesh screen or higher. The clay slurry may also be purified by passing the clay slurry through one or more additional mesh screens of the same or differing size and a hydrocyclone separator, or any piece of particulate sizing equipment.

The aqueous composition may have a specific gravity of about 1.20 to about 1.85.

Once an aqueous composition is formed, it may be filter pressed, e.g., at a minimum of about 90 psi for about 2, 3, 4, 5, or 6 hours, to remove excess water and to create a plastic mass. An aqueous composition that has been filter pressed takes on the form of a moldable clay material, which may then be vacuum extruded and then dried and formed into a shape or formed into a shape and then dried. The shape at this point may be a final shape or an intermediate shape. When formed into a final shape, the article is then glazed and then fired (e.g., in a kiln). When the article is formed into an intermediate shape, it may be bisque fired in a kiln, formed into a final shape, glazed, and then fired (e.g., in a kiln).

Other methods for processing aqueous clay compositions are known and can be used in the methods of the present invention. For example, aqueous compositions may be spray dried. Spray drying involves removing excess water by spraying the aqueous composition into a tower burner to form, e.g., small ceramic beads. The ceramic beads can then be processed through an isostatic press to form a roughly shaped article. The article can then be finished, e.g., by lathing, and then glazed and fired in a kiln. Alternatively, spray dried ceramic beads may be re-mixed with water to form a plastic mass, vacuum extruded to form a rough shape, dried, formed into a final shape, glazed, and fired (e.g., in a kiln)

In yet another embodiment, the aqueous composition is cast or spin-cast to form a shaped article. Casting can be used both as a means of removing excess water from the aqueous composition and forming the shaped article. Following casting, the formed article can be dried, glazed, and fired (e.g., in a kiln)

Drying may be carried out in the methods of the present invention to less than about 1% moisture by weight unless provision for moisture removal is provided in the firing process. In one embodiment, drying is carried out at a temperature of about 110° C. for about 24 hours. However, drying conditions at lower or higher temperatures for less or more time than 24 hours may also be suitable.

Suitable shapes of ceramic products include, without limitation, a hollow cylinder, tube, or other geometric shape having walls with any thickness. In one embodiment, the walls have a thickness of about 0.025 to about 0.250 inches (about 0.6 mm to about 6.5 mm). One of the distinct advantages of the aqueous compositions of the present invention is the ability to form porcelain material with thin walls.

The porcelain material formed by the methods of the present invention may be glazed. Glazing is accomplished by any one of several methods commonly used in the ceramics industry. An aqueous suspension of ceramic ingredients that, once fired in a kiln, forms the glaze. The glaze is applied to the dried but unfired article by spraying, rolling, or dipping the article so that an unfired thickness of about 0.006 inches to about 0.012 inches (about 0.15 mm to about 0.31 mm) is obtained on the surface of the article. Alternatively, the glaze may be applied to an article that has been partially fired or even fully fired, provided the article is then refired so the glaze melts and acquires the desired properties.

Suitable glaze compositions generally include ingredients such as clays, silica, and feldspar. Additional ingredients such as talc, wollastonite, whiting, or others are often added in varying amounts to enhance the formation of a glassy phase and to adjust the thermal expansion properties of a glaze. Still other ingredients such as zirconium silicate are added if an opaque glaze is desired. Ceramic oxides may be added to develop glaze color. Commercially prepared glass "frit" can be substituted for certain ingredients and prepared glaze color stains can be made or purchased to enhance certain properties. Glaze chemical formulae and compositions suitable for porcelain are readily available in the public domain and known by those knowledgeable about ceramics.

Firing of the porcelain material is performed at a heating rate and ultimate temperature which is dependent upon the particular composition and the geometry of the article being processed. A typical firing range is on the order of about 2012° F. (1100° C.) to about 2462° F. (1350° C.), and may be carried out in, e.g., a kiln for about 1 day to about 3 days. In one embodiment, firing is carried out at a range from about cone 6 to about cone 12.

Porcelain materials formed from the compositions of the present invention and/or the method of the present invention are friable-resistant and have a microstructure comprising less than about 1% by volume of individual crystals or closed pores greater than about 22, or about 21, 20, 19, 18, 17, 16, 15, 14, 13, 12, 11, or 10 microns in diameter.

Another aspect of the present invention relates to a friable-resistant dielectric porcelain material formed by the method of the present invention.

With reference now to FIGS. 1A-C, FIG. 1A illustrates a perspective view of one embodiment of a porcelain material of the present invention formed into a hollow cylinder or open-ended tube. Hollow cylinder 10 illustrated in FIG. 1A is also shown in the plan view of FIG. 1B. In the embodiment illustrated in FIGS. 1A-B, hollow cylinder 10 has a wall 12, with openings at either end, including open end 14 and open end 16. As shown in FIG. 1C, the wall 12 includes a fired porcelain material 18 coated with a glaze 20 on both interior and exterior surfaces thereof.

As used herein, the term "friable-resistant" means the material is resistant, over a prolonged period of time (e.g., days, weeks, months, or even years), to friability under conditions of rigorous thermal, chemical, and electrical stress. For example, thin walled tubes made from the materials of the present invention remain resistant to friability under steady state or cyclical ozone-producing conditions and in the presence of a voltage differential of 15 kv or more and electrical frequencies of 100 Ghz or more over prolonged periods of time. Materials of the present invention also remain resistant to friability over wide fluctuations of temperatures, e.g., heat generated by a diesel or gasoline engine within the engine compartment and then subsequent cooling of the engine and also repeated starting and stopping of the ozone generating device itself.

A further aspect of the present invention relates to a dielectric porcelain material comprising (I) or (II) as follows:

(I)
about 5% to about 7% $K_2O$,
about 0.2% to about 0.6% $Na_2O$,
about 16% to about 20% $Al_2O_3$, and
about 70% to about 75% $SiO_2$ or (II)
about 5% to about 6% $K_2O$,
about 0.2% to about 0.5% $Na_2O$,
about 50% to about 55% $Al_2O_3$, and
about 40% to about 42% $SiO_2$, In certain embodiments, the material comprises less than about 1% by volume of individual crystals or closed pores greater than 22 microns in diameter; the material has zero apparent porosity; or the material possesses all of these properties. The size limitation of these anomalies in the microstructure enhance both electrical and mechanical strength of the dielectric material.

According to one embodiment, the dielectric porcelain material has, on at least a portion of its surface, a glaze. In another embodiment, nearly the entire surface of the dielectric porcelain material is glazed. Thus, for example, a porcelain material of the present invention formed into an open-ended tube or hollow cylinder has, according to this embodiment, a glaze on both the exterior surface of the walls and the interior surface of the walls, or glaze on the internal and external surfaces. The latter embodiment is illustrated in FIG. 1C.

In one embodiment, the fired glaze has a silica to alumina ratio of about 4.8 to about 1 to about 5.6 to about 1.

In another embodiment, the fired glaze has a thermal coefficient of expansion less than the porcelain material beneath the glaze.

Methods to determine whether or not a material has zero apparent porosity are known by persons of ordinary skill in the art. For example, one method is described in ANSI C29.1 1988 82002, Section 5.4, which is hereby incorporated by reference in its entirety.

Another aspect of the present invention relates to a system for producing ozone. The system includes an electrode/dielectric assembly comprising a first and a second electrode and a dielectric device positioned between the first and second electrodes. The dielectric device comprises the dielectric porcelain material according to the present invention. The system also includes a voltage source connected to the first and second electrodes, where the voltage source is capable of producing a voltage differential between the first and second electrodes sufficient to allow the production of ozone between the electrodes.

Figure 2:
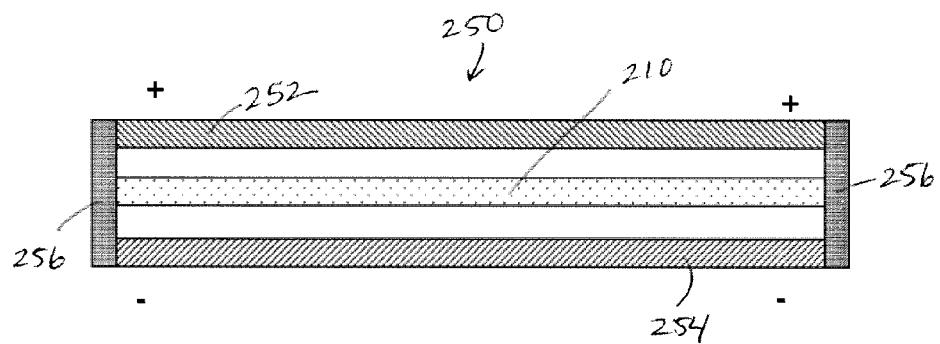
FIG. 2 is a schematic diagram of one embodiment of a system for producing ozone of the present invention. The system includes a first and a second electrode and a dielectric device. The dielectric device is positioned between the first and second electrodes. The dielectric device is formed from a friable-resistant dielectric porcelain material of the present invention.

In one embodiment illustrated in FIG. 2, system 250 includes first electrode 252, second electrode 254, and dielectric device 210. System 250 also includes support members 256.

Figure 3:
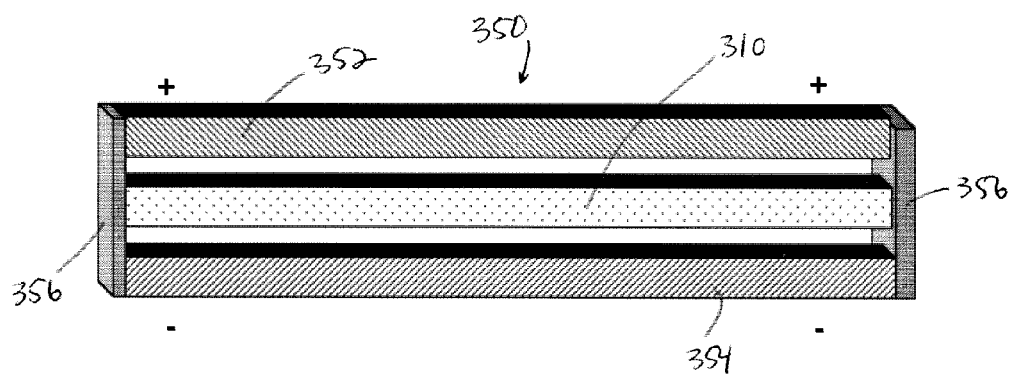
FIG. 3 is a perspective view of one embodiment of a system for producing ozone of the present invention. The system includes a first and second electrode in the form of a flat plat or a bar and a dielectric device also in the form of a flat plate or a bar. The dielectric device is positioned between the first and second electrodes. The dielectric device is formed of a friable-resistant dielectric porcelain material of the present invention.

As illustrated in FIG. 3, which is a perspective view of one embodiment of a system for producing ozone of the present invention, system 350 is constructed of first electrode 352, second electrode 354, and dielectric device 310 in the shape of a plate or a bar. System 350 also includes support members 356. Other shapes and/or configurations of the system of the present invention may also be used.

The ozone generators of the present invention typically operate by connection to a high voltage and a high frequency power supply. For example, one such device uses a DC to AC inverter which converts the 12 VDC battery voltage to at least about 3,000 volts AC, and as high as about 32,000 volts AC or more, at a frequency preferably up to 100 Ghz. Both the output voltage and frequency may be adjustable. The (e.g., metal) electrodes are attached to the high voltage output of the inverter which in turn produces ozone from the oxygen in the air passing around the ozone generator.

Another aspect of the present invention relates to a system comprising an internal combustion engine coupled to the system for producing ozone according to the present invention.

Figure 4:
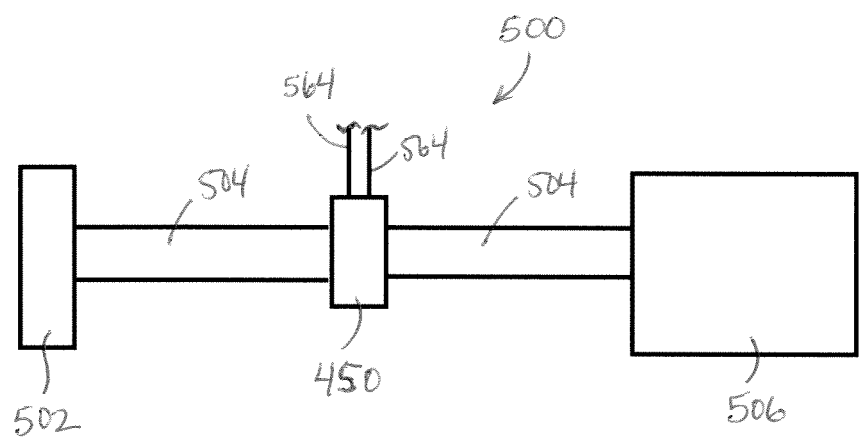
FIG. 4 is a block diagram of one embodiment of a system comprising an internal combustion engine coupled to a system for producing ozone of the present invention.

As illustrated in FIG. 4, system 500 includes system for producing ozone 450 (which includes electrical connectors 564 to a voltage source) installed directly between air filter 502 and diesel engine 506 along manifold chamber 504. The incoming filtered clean air is passed along the electrically charged electrode screens of system 450, where the oxygen in the air is converted to ozone and subsequently enters the combustion chamber of the diesel engine. The ozone facilitates the diesel engine fuel to burn more efficiently and minimizes the residual exhaust particulates and gases resulting in substantially less environmental pollution.

EXAMPLES

The following examples are provided to illustrate embodiments of the present invention but are by no means intended to limit its scope.

Example 1

Production of Thin-Walled High Performance Dielectric Porcelain Tubes with High Resistance to Friability for Ozone Generator There are two bodies used in producing these dielectrics—an alumina based porcelain and a silica based porcelain.

The process for either alumina or silica porcelain starts with the development of the main portion of the body—the matrix—which will carry the higher refractory elements of the porcelain. It is important in the process to develop a uniform microstructure in the final product which will allow it to withstand the aggressive environment within the ozone generator. The steps below are designed to permit that to occur.

The process starts with a blend of suitable ball clays.

Each of these materials is tested for particle size distribution, moisture content, and specific surface area. The chemical analyses provided by the supplier is reviewed for conformance to specifications.

These materials are mixed with sufficient water in a blunger (mixer) to achieve a specific gravity of 1.290. The mixing is carried out for no less than 2 hours and achieves a fluidity sufficient to allow pumping.

The slurry is then sent to a high intensity mixer for 45 minutes or more while adding water to reduce the specific gravity to about 1.19. From the mixer the slurry is processed through a 150 mesh screen with any particles exceeding that mesh size removed from the slurry. The slurry is further sent through a hydrocyclone separator to remove oversized particles of any nature. Samples of the slurry are tested for conductivity, viscosity, specific gravity, temperature and coarse particle residue.

Alumina Body

Calcined alumina and Potash Feldspar are added to the purified ball clay slurry. Unfired alumina porcelain body material reclaimed from forming operations are typically added so that they comprise 33% to 66% of the final mix. The specific gravity of the mixture is adjusted to about 1.43 as the mixture is processed for a minimum of 30 minutes in the blunger. Calcium chloride is used as a flocculant. A target viscosity of 4000 centipoise is achieved.

The alumina body has a composition of:
24% Feldspar
35% Alumina
41% purified ball clay Silica Body Crystalline silica, Potash Feldspar, and Kaolin are added to the purified ball clay slurry with sufficient water to achieve a 1.4 specific gravity and blunged (mixed) for 30 minutes. Unfired silica porcelain body material reclaimed from forming operations are typically added so that they comprise 45% to 55% of the final mix. As with the Alumina body, calcium chloride is added as a flocculant and the viscosity measured. The target viscosity is 4000 centipoise.

The resulting body composition is then:

31% Feldspar 25.1% Silica

10% Kaolin

34% purified ball clay

The same tests as for the Alumina body are used. Reclaim can be added to each batch between 45% and 55% after being brought back into suspension.

The resulting bodies are then passed through 120 mesh screen to assure uniformity of particle size and then through a magnetic filter.

The slurry is pumped into the filter press. The alumina and silica bodies are filter pressed to achieve a moisture content between 16.5% and 19.5%.

A vacuum extruder is fed with filter cake from the above process. Hollow cylindrical tube porcelain blanks are formed by the extruder using a combination of a nozzle and an internal mandrel. Sufficient wall thickness is maintained to prevent deformation of the hollow cylinder during handling and drying. In this example, a wall thickness of about 1.5 inches and an internal diameter of about 3.78 inches was maintained for an article that was to have a 3.5 inch I.D. after firing.

The blanks are dried for 48 to 64 hours at 185° F. (85° C.) to a moisture content of 2% or less.

The dried blanks are dry machined on a lathe to ¼ inch (6.35 mm) wall thickness.

The dry finished pieces are bisque fired to cone 06 over a 24 hour cycle reaching 1800° F. (982° C.).

Following bisque firing, the pieces are again finished using diamond coated tooling to machine them to appropriate dimensions and a smooth finish.

The glaze process uses a slurry of the fired chemistry shown in Table 1. The raw materials are milled in a ball mill for 16-20 hours.

The glaze is tested extensively for color, fusibility (glass formation), and strength. A strength increase of 25% to 35% compared to the unglazed porcelain strength is required.

The bisque fired blanks are lightly sponged with water and then dipped for 7 seconds in the glaze slurry. They are dried and then fired in the tunnel kiln at cone 10.

The ends are cut off with a diamond abrasive wheel to achieve the desired length and a smooth finish.

Using the examples as described herein, tubes as long as about 14 inches (~35 cm), having a diameter of up to about 4 inches (~10 cm), and having a wall thickness less than about 0.110 inches (~0.28 mm) have been produced.

The finished chemistry of the fired materials is provided in Table 1 below.

TABLE 1

After Firing Calculated Chemistry of Porcelains and Glaze Suitable for Thin Walled Ozone Generator Tubes

|  | Glaze | Silica Porcelain | Alumina Porcelain |
| --- | --- | --- | --- |
| CaO | 11.97 | 0.17 | 0.12 |
| MgO | 1.69 | 0.08 | 0.08 |
| $K_2O$ | 3.00 | 6.06 | 5.26 |
| $Na_2O$ | 0.93 | 0.37 | 0.38 |
| $P_2O_5$ | 0.02 | — | — |
| $TiO_2$ | 0.04 | 0.72 | 0.68 |
| $Al_2O_3$ | 14.57 | 18.62 | 51.48 |
| $SiO_2$ | 67.48 | 73.44 | 41.45 |
| $Fe_2O_3$ | 0.30 | 0.53 | 0.54 |
| MnO | tr | — | — |
| Total | 99.99 | 99.99 | 99.99 |

All numbers in % by weight.

What is claimed:

1. A composition for forming a friable-resistant dielectric porcelain material, said composition comprising either (A) or (B) as follows:

(A)

feldspar at about 21% to about 27% by weight, wherein at least 99.9% of the feldspar has a particle size less than about 72 microns and the feldspar has a potash to soda ratio of at least 10 to 1;

calcined alumina at about 32% to about 38% by weight, wherein at least 99.9% of the calcined alumina has a particle size less than about 44 microns; and clay at about 37% to about 43% by weight, wherein at least 99.9% of the clay has a particle size less than about 22 microns;

(B)

feldspar at about 28% to about 34% by weight, wherein at least 99.9% of the feldspar has a particle size less than about 72 microns and the feldspar has a potash to soda ratio of at least about 10 to 1;

crystalline silica at about 22% to about 28% by weight, wherein at least 99.9% of the crystalline silica has a particle size less than about 44 microns; and clay at about 41% to about 47% by weight, wherein at least 99.9% of the clay has a particle size less than about 22 microns.

2. The composition according to claim 1 further comprising:

water, wherein the composition is an aqueous composition.

* * * * *